United States Patent [19]
Davidson et al.

[11] Patent Number: 5,941,485
[45] Date of Patent: Aug. 24, 1999

[54] ASSEMBLY FOR MOUNTING A REMOVABLE STEP TO A HOLLOW UTILITY POLE

[75] Inventors: James W. Davidson, Laurens; Dennis S. Bradley; Gregory S. Hosford, both of Columbia; John F. Boozer, III, Pomaria, all of S.C.

[73] Assignee: Shakespeare Company, Newberry, S.C.

[21] Appl. No.: 08/904,634

[22] Filed: Aug. 1, 1997

[51] Int. Cl.⁶ ...................................................... F21V 21/00
[52] U.S. Cl. ................................. 248/218.4; 248/224.51; 411/340; 411/119
[58] Field of Search ............................ 248/218.4, 219.1, 248/219.2, 219.4, 292.14, 224.51, 223.41; 411/340, 344, 345, 346, 119

[56] References Cited

U.S. PATENT DOCUMENTS

| | | | |
|---|---|---|---|
| 3,158,349 | 11/1964 | Bergstrom | 248/218.4 |
| 4,548,377 | 10/1985 | Huel | 248/219.1 |
| 5,220,744 | 6/1993 | Kendall | 248/218.4 |
| 5,761,875 | 6/1998 | Oliphant et al. | 248/218.4 |

*Primary Examiner*—Leslie A. Braun
*Assistant Examiner*—Willie Berry, Jr.
*Attorney, Agent, or Firm*—Renner, Kenner, Greive, Bobak, Taylor & Weber

[57] ABSTRACT

A step mounting assembly adapted for demountably securing a removable step member to a hollow utility pole. The step mounting assembly utilizes a backing plate having an obverse and a reverse face. An aperture penetrates the backing plate to receive the shank portion of a mounting bolt with the head thereof disposed in opposition to the obverse face of the mounting plate. A projection extends outwardly from the reverse face of the unique backing late at least partially to circumscribe the aperture that penetrates the backing plate. A spacer lug extends outwardly from the obverse face of the backing plate, the spacer lug being located in proximity to the aforesaid aperture. A washer is interposed between the bolt head and the spacer lug. An elongated bar nut is adapted to engage the threaded shank on the mounting bolt while the bar nut is captured within the projection disposed on the reverse side of the unique backing plate.

20 Claims, 9 Drawing Sheets

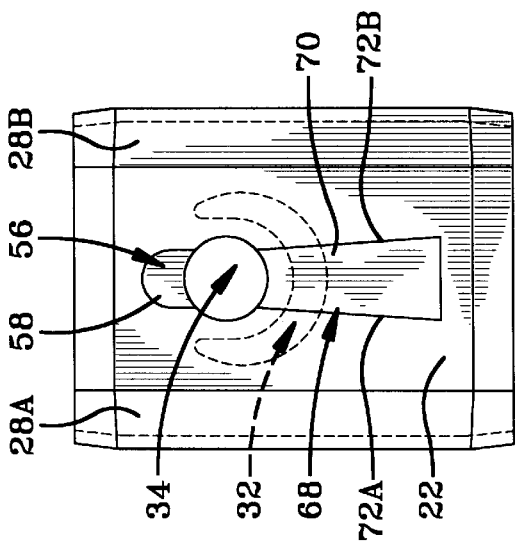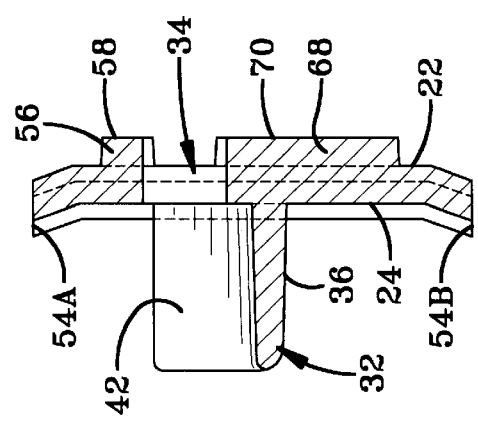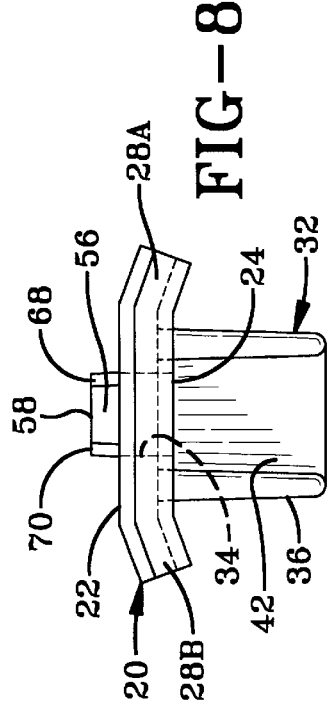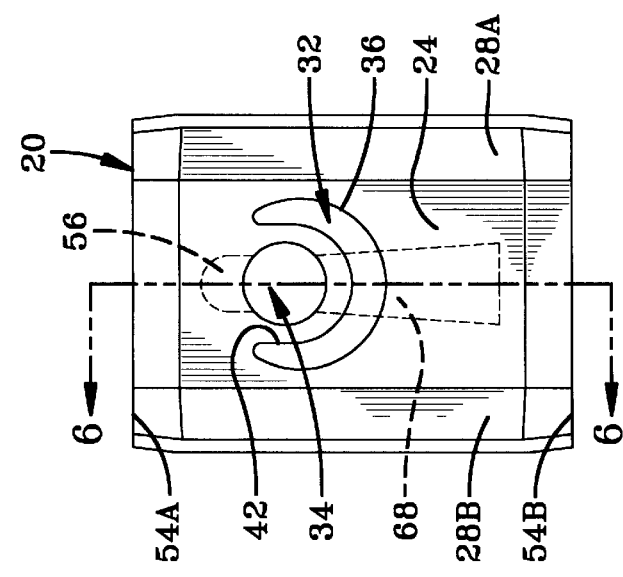

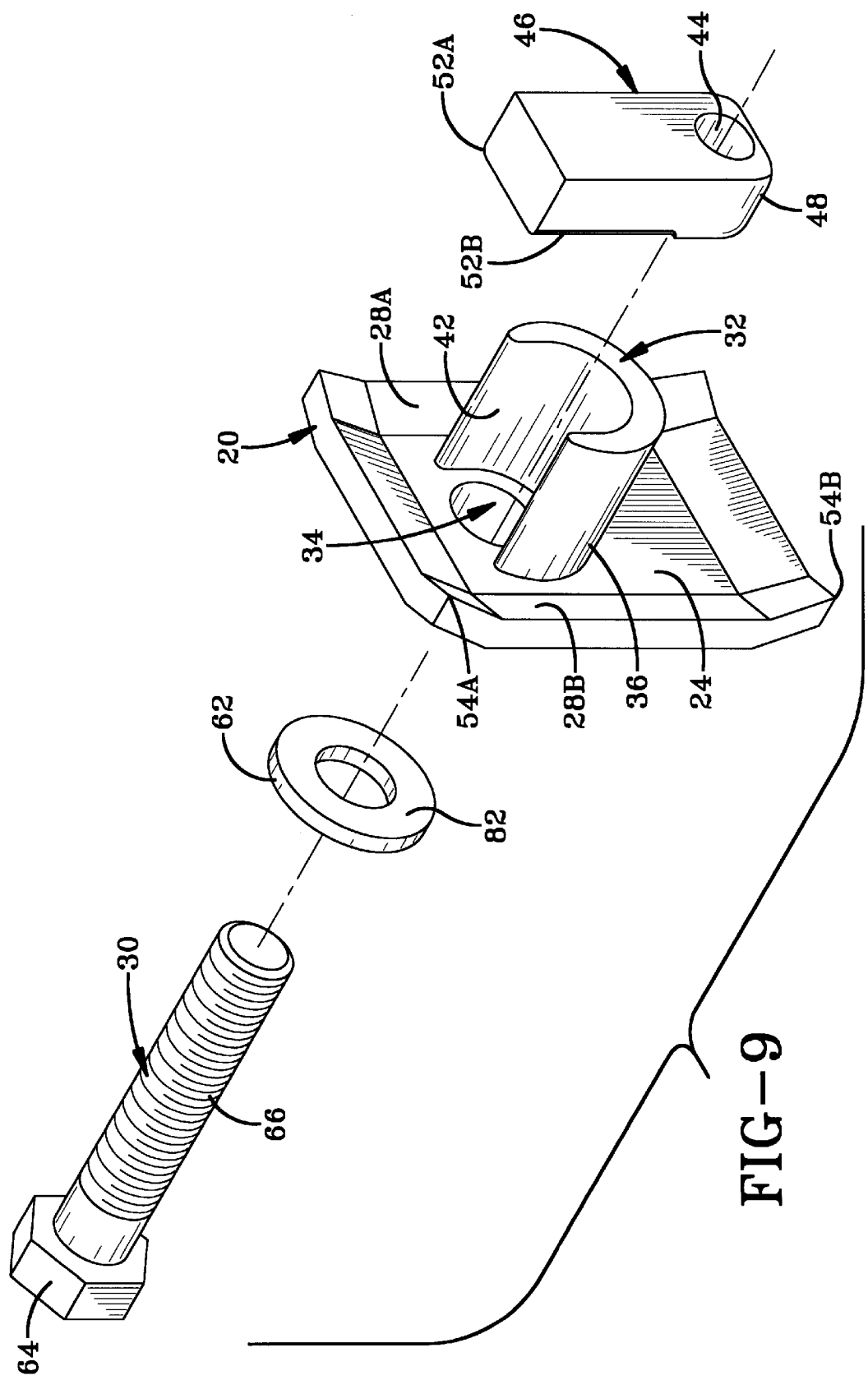

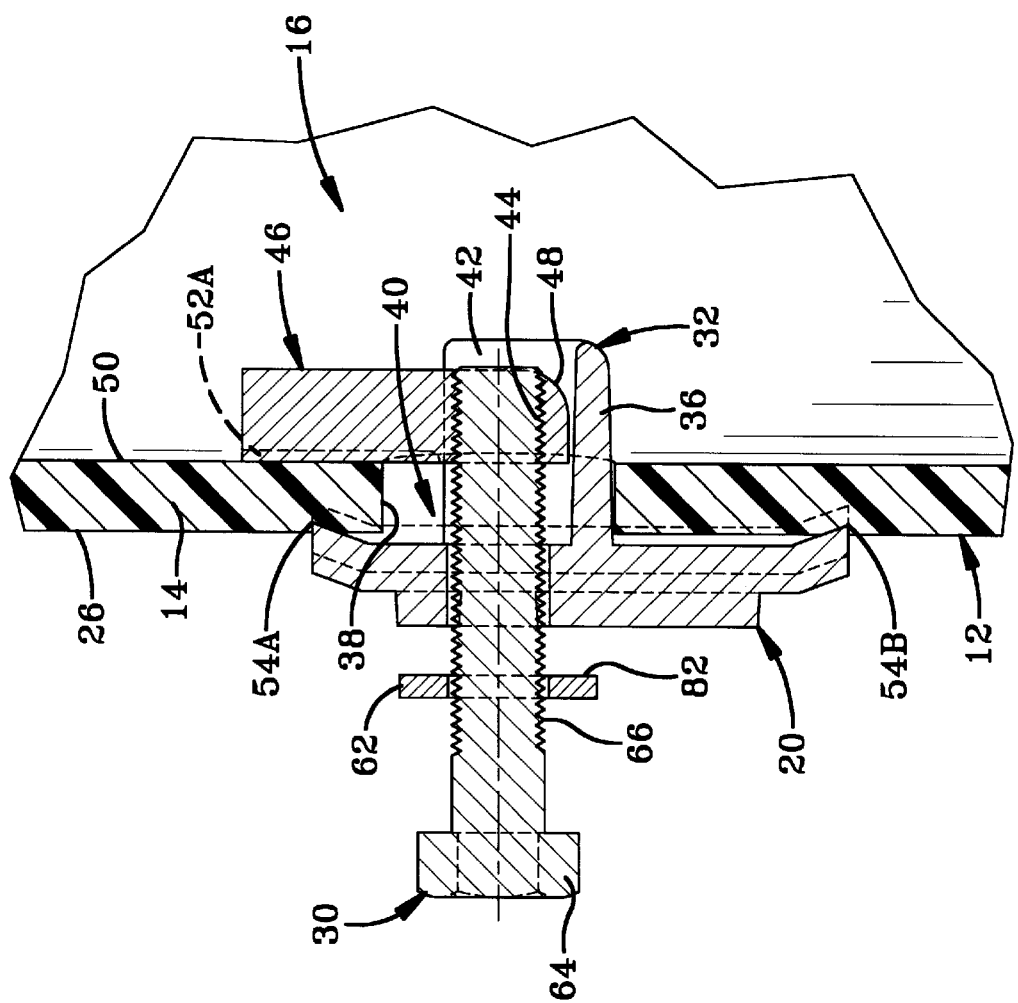

ASSEMBLY FOR MOUNTING A REMOVABLE STEP TO A HOLLOW UTILITY POLE

TECHNICAL FIELD

The present invention relates generally to utility poles. More particularly, the present invention relates to a structural assembly to facilitate climbing utility poles. Specifically, the present invention relates to an assembly that may be permanently mounted on a hollow utility pole demountably to receive a removable step member.

BACKGROUND OF THE INVENTION

Utility poles (a designation which is intended to include lighting poles, power transmission poles, sign supporting poles or any similar structure) are generally too tall conveniently to be scaled by ladders. Nor is it always convenient to use a mechanical, hydraulic or pneumatic power lift, such as the well known "cherry picker" bucket.

Historically, when virtually all utility poles were made of solid wood, the poles were climbed by linemen provided with "climbers" having an L-shaped, metallic frame that could be strapped onto the lineman's foot and lower leg to present a laterally extending, downwardly directed spur that could be driven into the pole by the application of pressure to the L-shaped frame by the lineman's foot. Sequential insertion of the spur on the "climber" worn on one leg and then the climber worn on the other leg permits a lineman to walk step-by-step up the pole. The use of climbers requires considerable strength and skill, but even the most accomplished lineman can encounter a location along the length of the pole which will not properly secure the spur to support the weight of the lineman and may, therefore, allow the spur to "break out." Even with a safety strap, or belt—which should preclude a complete free fall—the lineman may find himself sliding down along the pole against the brutal action of the upwardly directed splinters.

Eventually, utility poles were provided with permanent steps that were driven, or screwed, into the pole at spaced distances along the vertical extent of the pole. Such permanent steps would permit a lineman to ascend the pole with little more effort than climbing a ladder. Generally, the lowermost of the permanent steps would be located at a height which could not conveniently be reached from the ground, but could be reached by using the previously described "climbers" or by a relatively short ladder. In any event, there was always the threat of enticing an unauthorized person to scale to the first step and then easily climb the pole with its attendant dangers to the unskilled.

Demountable step members were the next phase in the progression, and demountable step members have been available for use on wooden utility poles for many years. Demountable step members for wooden utility poles were secured to special nails that were permanently driven into the wood. Such an arrangement, however, is not usable on hollow utility poles inasmuch as the special nail derives its supporting ability by being almost fully inserted into a solid member.

Attempts have been made to secure the head of a special bolt interiorly of the hollow utility pole with the threaded shank portion extending radially outwardly through the wall of the pole and then tightening a stamped metal plate onto the threaded shank with a nut and washer so as to permit demountably securing a step member to the mounting plate. Because the walls of hollow utility poles do not always have a constant, predetermined thickness, this approach requires the use of bolts having a sufficient length to accommodate a wide variety of wall thicknesses. The use of bolts which are longer than absolutely necessary itself induces inherent flaws. First, if the threaded shank portion has any excessive length, that excess length poses a potential hazard in that it tempts reckless individuals to try and climb the pole without using demountable step members. Second, were one to sever any excess length from the shank portion after the bolt has been installed, that act would damage any protective galvanizing coating that may have been applied to the bolt. Third, the excessive length of the threaded shank portion on each bolt constitutes an undesirable protuberance which can snag the safety belt, tool belt or even the clothing of an accomplished line man.

SUMMARY OF THE INVENTION

It is, therefore, a primary object of the present invention to provide a novel step mounting assembly that may be permanently secured to a hollow utility pole and onto which a step member may be demountably secured.

It is another object of the present invention to provide a step mounting assembly, as above, which is readily adapted for use with hollow poles, even though such poles may have a wide variation in their wall thicknesses.

Moreover, it is a corresponding object of the present invention to provide a step mounting assembly, as above, which presents no variation in the dimension to which the step mounting assembly, or any portion thereof, extends radially outwardly of the pole, irrespective of the wall thickness of the pole on which the step mounting assembly is installed.

It is a further object of the present invention to provide a step mounting assembly, as above, which does not require severing the mounting bolt and thereby damaging any protective, or galvanizing, coating applied to the mounting bolt.

It is still another object of the present invention to provide a step mounting assembly, as above, which can be manually positioned by a simple button-holing insertion of a portion of the step mounting assembly through an appropriate bore in the wall of the utility pole and then tightening a mounting bolt from exteriorly of the utility pole.

It is a still further object of the present invention to provide a step mounting assembly, as above, which self-aligns with respect to the longitudinal axis of the utility pole.

It is yet another object of the present invention to provide a step mounting assembly, as above, which incorporates a new and novel backing plate that may be secured by a standard bolt and washer.

It is an even further object of the present invention to provide a step mounting assembly, as above, which incorporates an elongated bar nut not only to distribute the clamping pressure over an extended area on the interior surface of the utility pole wall but also to facilitate installation of the step mounting assembly on a hollow utility pole.

It is a still further object of the present invention to provide a step mounting assembly, as above, wherein the configuration of the novel backing plate serves: (1) to confine the elongated bar nut against rotation when the mounting assembly is either being secured or removed; (2) to effect self-alignment; and, (3) to distribute the vertical loading applied by use of the step member over an increased cross sectional area in the wall of the utility pole.

These and other objects of the invention, as well as the advantages thereof over existing and prior art forms, which will be apparent in view of the following detailed specification, are accomplished by means hereinafter described and claimed.

In general, a step mounting assembly embodying the concepts of the present invention is adapted for demountably securing a removable step member to a hollow utility pole. The step mounting assembly utilizes a novel and unique backing plate having an obverse and a reverse face. An aperture penetrates the backing plate to receive the shank portion of a mounting bolt with the head thereof disposed in opposition to the obverse face of the mounting plate.

A projection extends outwardly from the reverse face of the unique backing plate at least partially to circumscribe the aperture that penetrates the backing plate. A spacer lug extends outwardly from the obverse face of the backing plate, and the spacer lug is located in proximity to the aforesaid aperture. A washer is interposed between the bolt head and the spacer lug.

An elongated bar nut is adapted to engage the threaded shank on the mounting bolt while the bar nut is captured within the projection disposed on the reverse side of said unique backing plate.

To acquaint persons skilled in the pertinent arts most closely related to the present invention, one preferred embodiment of a step mounting assembly that illustrates a best mode now contemplated for putting the invention into practice is described herein by, and with reference to, the annexed drawings that form a part of the specification. The exemplary step mounting assembly is described in detail without attempting to show all of the various forms and modifications in which the invention might be embodied. As such, the embodiment shown and described herein is illustrative, and as will become apparent to those skilled in these arts, can be modified in numerous ways within the scope and spirit of the invention the invention—being measured by the appended claims and not by the details of the specification.

BRIEF DESCRIPTION OF THE DRAWINGS

FIG. 5 is a rear elevation of the backing plate depicted in FIGS. 3 and 4;

FIG. 6 is a vertical cross section taken substantially along line 6—6 of FIG. 5;

FIG. 7 is a frontal elevation of the backing plate depicted in FIGS. 3 through 6;

FIG. 8 is a top plan view of the backing plate depicted in FIGS. 3 through 7;

FIG. 9 is an exploded perspective of the step mounting assembly depicted in the previous figures for demountably securing a removable step member to a hollow utility pole;

FIG. 10 is a vertical section of the step mounting assembly to which FIG. 9 is directed, the components of the step mounting assembly being partially assembled and disposed for insertion into a receiving bore provided in the wall of a hollow utility pole, a portion of which is also depicted in vertical section;

FIG. 13 is a view similar to FIGS. 10 through 12 but depicting the step mounting assembly as properly disposed within the bore in the hollow utility pole and ready to be secured in position by tightening the bolt; and, FIG. 14 is a view similar to FIGS. 10 through 13 but depicting the step mounting assembly operatively secured to the hollow utility pole and also showing, in partial section, a prior known step member adapted to be demountably secured on the step mounting assembly.

DESCRIPTION OF AN EXEMPLARY EMBODIMENT

Figure 1:
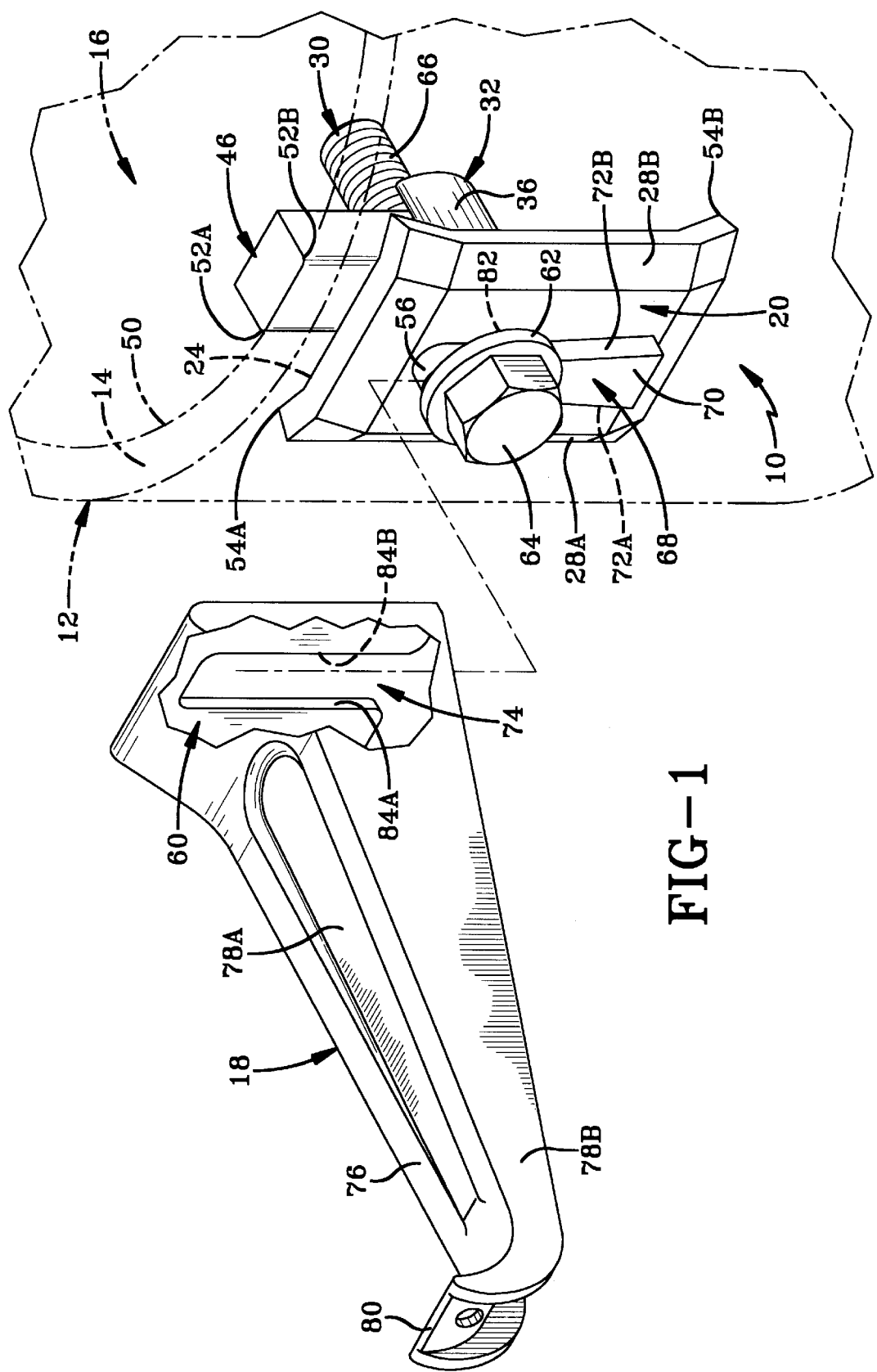
FIG. 1 is partially exploded perspective of a combination including a step mounting assembly embodying the concepts of the present invention depicted as being installed on a hollow utility pole (represented in phantom) and a step member of the type presently known to the art.

An improved, step mounting assembly by which removably to secure a step member to a hollow utility pole, wherein the step mounting assembly embodies the concepts of the present invention is designated generally by the numeral 10 on the accompanying drawings. As is depicted in FIG. 1, the step mounting assembly 10 is utilized in conjunction with a utility pole 12 that has an annular (though it may well taper from the base toward the top) wall 14 which circumscribes a hollow interior 16. The mounting assembly 10 permits a step member 18, of the type known to the art, to be demountably secured on the utility pole 12.

As will become more apparent, when the step member 18 is removed, that portion of the step mounting assembly 10 which remains exposed on the exterior of the hollow utility pole 12 does not provide a means, in and of itself, which facilitates climbing the utility pole 12, nor is the step mounting assembly 10 sufficiently exposed to be particularly injurious to one attempting to climb the utility pole 12 without the use of the step member 18. Moreover, the exposed portions of the assembly 10 have not been altered after installation so that any protective coating and/or galvanization will not have been compromised.

Figure 2:
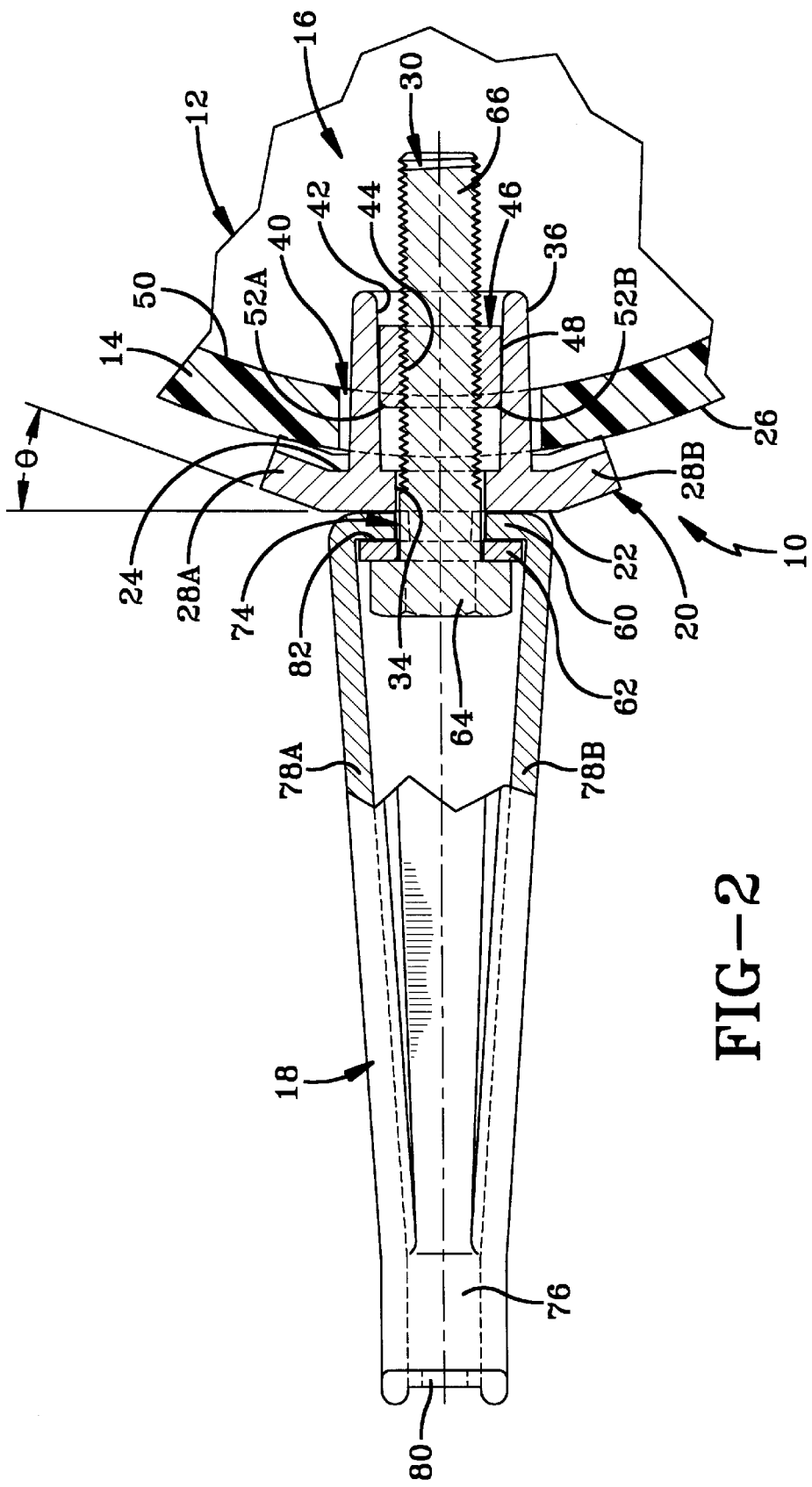
FIG. 2 is a top plan, partially broken away and partly in section, of the combination depicted in FIG. 1 but with the combination fully assembled and ready for use.
Figure 3:
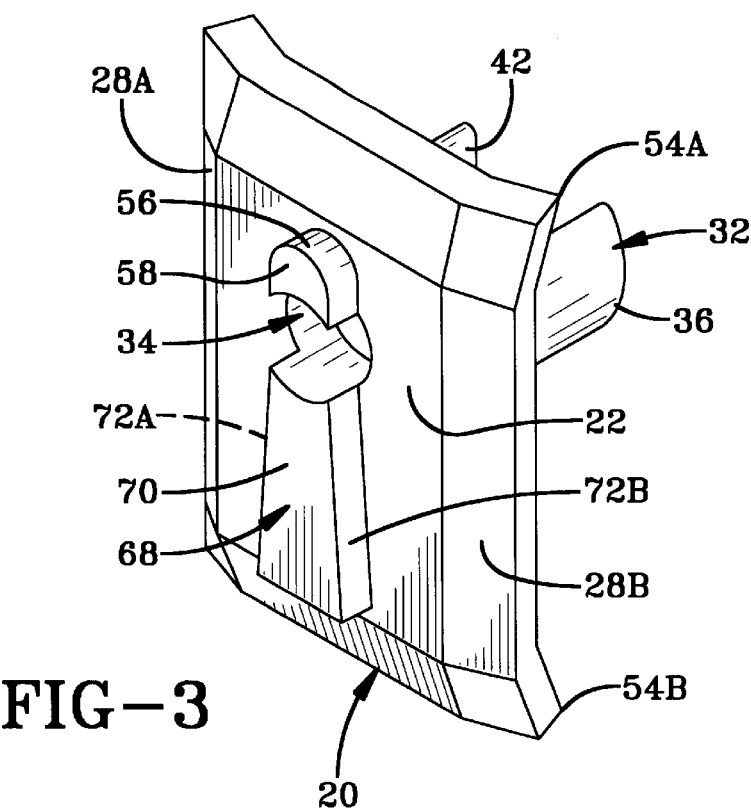
FIG. 3 is a frontal perspective of a backing plate used in the step mounting assembly for demountably securing a removable step member to a hollow utility pole, as represented in FIGS. 1 and 2.
Figure 4:
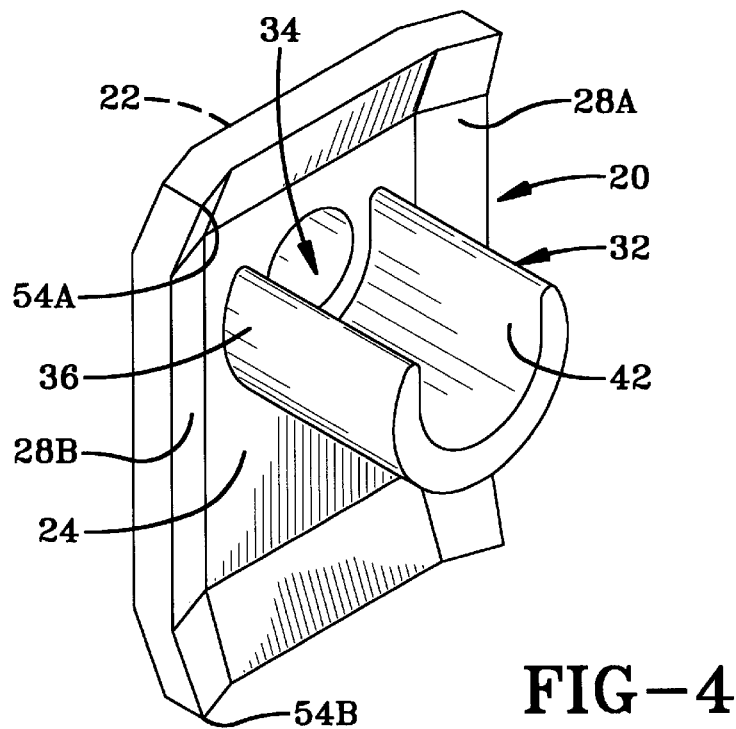
FIG. 4 is a rear perspective of the backing plate depicted in FIG. 3.

With reference generally to FIGS. 1 and 2 but more specifically to FIGS. 3 through 9, the step mounting assembly 10 incorporates a backing plate 20 which presents an obverse face 22 that defines the exposed, exterior surface thereof. The reverse face 24 of the backing plate 20—when the mounting assembly 10 is secured to the utility pole 12, as best represented in FIG. 2—lies in opposed, preferably contiguous, juxtaposition to the exterior surface 26 on the wall 14 of the utility pole 12.

The backing plate 20 may be laterally bounded by longitudinally extending wing portions 28A and 28B that are inclined angularly away from the plane defined by the obverse face 22 of the backing plate 20, as designated by the angle $\Theta$ in FIG. 2. The wing portions 28 are employed to impart stability of the backing plate 20 with respect to the utility pole 12. That is, when the backing plate 20 is mounted on the annular wall 14, the wing portions 28 embracingly engage the exterior surface 26 and prevent the backing plate from rotating with respect to the hereinafter described, single mounting bolt 30 by which a step mounting assembly 10 is secured to the utility pole 12. Typically, the angle Θ may have a value of approximately 20° in order to achieve the desired objective.

Continuing with the description of the backing plate 20, a multi-functional projection 32 extends perpendicularly outwardly from the reverse face 24 of the backing plate 20, and the projection 32 at least partially circumscribes an aperture 34 which penetrates the backing plate 20. For reasons that will hereinafter become apparent, the aperture 34 is preferably tapered progressively from the obverse face 22 to the reverse face 24 on the order of approximately 5° such that the aperture 34 is larger when it penetrates the reverse face 24 than it is when in penetrates the obverse face 22.

Preferably the radially outer bearing transfer surface 36 on the multi-functional projection 32 is curved fully to engage the lower half of the cylindrical surface 38 (FIG. 10) presented by a receiving bore 40 that penetrates the annular wall 14 of the utility pole 12. As such, any downwardly directed loading applied to the mounting assembly 10 is transferred to an increased cross sectional area in the wall 14 of the of the utility pole 12.

The multi-functional projection 32 also presents a radially inner, anti-rotation shroud 42, and as such the radially inner and radially outer surfaces 42 and 36, respectively, define the multi-functional projection 32 as having a generally U-shaped cross sectional configuration. The radially inner, anti-rotation shroud surface 42 on the projection 32 is spaced radially outwardly with respect to the aperture 34 which penetrates the backing plate 20 in order to permit the threaded bore 44 of an elongated bar nut 46 to align with the aperture 34 when the rounded end 48 of the elongated bar nut 46 is received within the confines delineated by the radially inner, anti-rotation shroud surface 42 of the multi-functional projection 32. The radially inner, anti-rotation shroud surface 42 is, like aperture 34, also preferably tapered to present a progressively enlarged transverse dimension as the multi-functional projection 32 extends away from the reverse face 24.

By thus defining a relatively close fit of the elongated bar nut 46 within the confines of the U-shaped projection 32 as defined by the anti-rotation shroud surface 42, the elongated bar nut 46 will not rotate in response to rotation of the mounting bolt 30. That is, the U-shaped configuration of the multi-functional projection 32 also precludes relative rotation between the elongated bar nut 46 and the projection 32. In addition, the wing portions 28 preclude relative rotation of the backing plate 20 with respect to the utility pole 12. Hence, when one rotates the mounting bolt 30 to screw it into the threaded bore 44 in the elongated bar nut 46, the bar nut 46 and backing plate 20 will remain fixedly disposed against rotation and will firmly clamp the annular wall 14 therebetween. To allow full accommodation of the elongated bar nut 46 to the interior surface 50, the edges 52A and 52B of the bar nut 46 which lie in contiguous juxtaposition with the interior surface 50 of the annular wall 14 are preferably rounded.

Toothed crests 54A and 54B may also be provided further to assure stabilization of the backing plate 20 with respect to the utility pole 12 on which it is mounted. That is, the toothed crests 54 may extend outwardly from the upper and lower edges of the reverse face 24 on the backing plate 20 to engage the exterior surface 26 on the annular wall 14 of the pole 12 when the mounting bolt 30 is tightened to sandwich the wall of the pole 12 between the backing plate 20 and the elongated bar nut 46. It should be appreciated that when using the mounting assembly 10 in conjunction with metallic poles the extent to which the toothed crests 54 extend outwardly from the reverse face 24 is not as critical as when using toothed crests in conjunction with fiber reinforced polymer (FRP) utility poles. In the latter situation the distance which the toothed crests extend must be carefully considered so the toothed crests 54 will not inadvertently sever any of the fibers used to reinforce the pole.

A spacer lug 56 extends perpendicularly outwardly from the obverse face 22 of the backing plate 20, and the spacer lug 56 is also located in proximity to the aperture 34 that penetrates the backing plate 20. The dimension between the obverse face 22 and the outer face 58 of the spacer lug 56 should only slightly exceed the thickness of the hereinafter described securing plate 60 on the step member 18, as will be hereinafter more fully described. As such, the outer face 58 of the spacer lug 56 serves as a stop against which a washer 62 is juxtaposed when the head 64 of the mounting bolt 30 is turned fully to tighten the threaded shank portion 66 of the mounting bolt 30 into the threaded bore 44 of the elongated bar nut 46. Hence, when the mounting assembly 10 is secured to the utility pole 12, the spacing between the washer 62 and the obverse face 22 of the backing plate 20 comports to a predetermined value.

A stabilizing lug 68 also extends perpendicularly outwardly from the obverse face 22 of the backing plate 20. The stabilizing lug 68 is preferably located on the opposite side of the aperture 34 relative to the spacer lug 56, and the outer surface 70 of the stabilizing lug 68 should preferably lie in the same plane as the outer face 58 of the spacer lug 56. By that arrangement, the stabilizing lug 68 may be disposed in sufficient proximity to the aperture 34 that the washer 62 may rest against both the outer face 58 on the spacer lug 56 as well as the outer surface 70 on the stabilizing lug 68.

The stabilizing lug 68 is preferably provided with side walls 72A and 72B that taper in such a manner as to flare progressively apart away from the spacer lug 56. The tapered side walls 72 on the stabilizing lug 68 cooperatively interact with a slotted notch 74 in the securing plate 60 so as further to immobilize the step member 18 against undesirable rotation thereof about the mounting bolt 30 when the step member 18 is received on the mounting assembly 10.

With reference to FIGS. 1 and 2, it can be observed that the well known step member 18 has tread portion 76 the inner portion of which is connected to the securing plate 60 such that the overall disposition of the tread portion 76 is disposed at substantially right angles with respect to the securing plate 60. The sides of the tread portion 76 are also connected to the securing plate 60, as by reinforcing flanges 78A and 78B. The outer portion of the tread portion 76 terminates in an upwardly flaring lip 80 which tends to preclude the foot of the user from sliding inadvertently off the tread portion 76.

Installation of the Mounting Assembly

Figure 10:
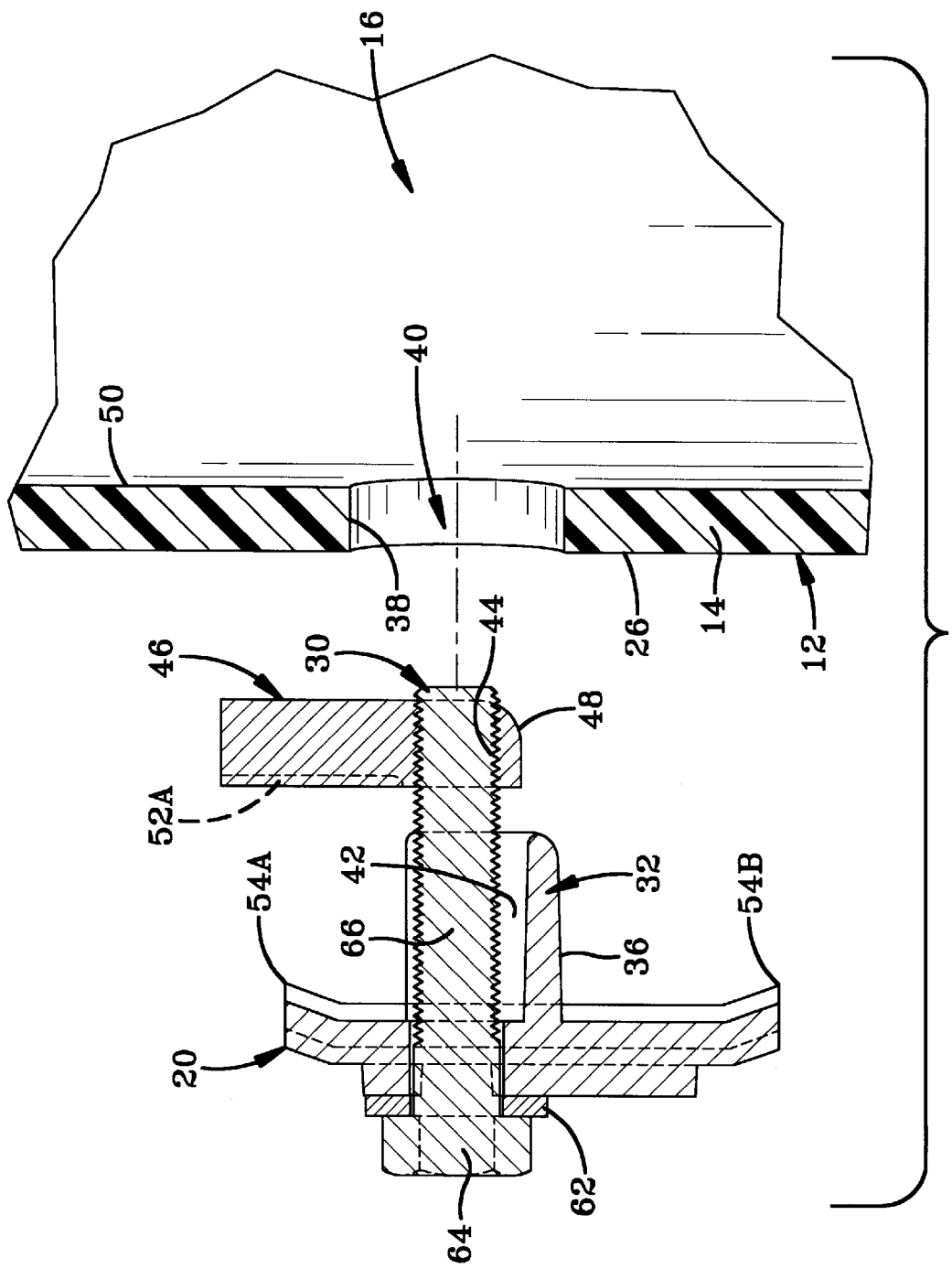
Figure 11:
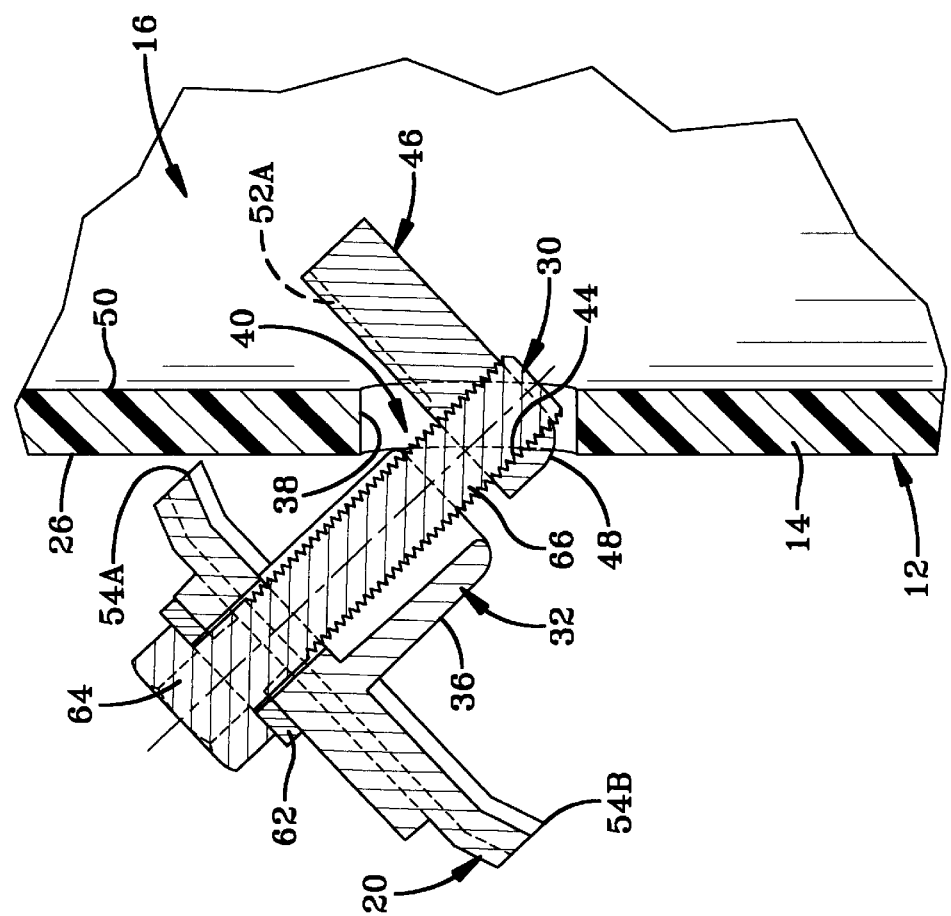
FIG. 11 is a view similar to FIG. 10 but depicting the next sequential step of effecting a "button-hole" insertion of an appropriate portion of the step mounting assembly into the receiving bore.

To install the step mounting assembly 10 in any one of the receiving bores 40 provided in the annular wall 14 of a hollow utility pole 12, one partially assembles the step mounting assembly 10 so that the components, as depicted in FIG. 9, are disposed as depicted in FIG. 10. That is, the threaded shank portion 66 of the mounting bolt 30 is inserted through a washer 62 and then the aperture 34 in the backing plate 20. The threaded shank portion 66 of the mounting bolt 30 is then screwed into the threaded bore 44 in the elongated bar nut 46, but not fully tightened. That permits the bar nut 46 to be displaced outwardly and away from the multi-functional projection 32 which extends outwardly from the reverse face 24 of the backing plate 20, as represented in FIG. 10. So disposed, the elongated bar nut 46 may be inserted, in button-hole fashion, through the receiving bore 40 in the annular wall 14 of the hollow utility pole 12, as represented in FIG. 11. This button-hole insertion is completed by manipulating the partially assembled step mounting assembly 10 from the disposition represented in FIG. 11 to the disposition depicted in FIG. 12. The manipulation required to effect the button-holing insertion of the elongated bar nut 46 may be enhanced if the aperture 34 is tapered, thus permitting some canting of the mounting bolt 30 with respect to the backing plate 20.

Figure 12:
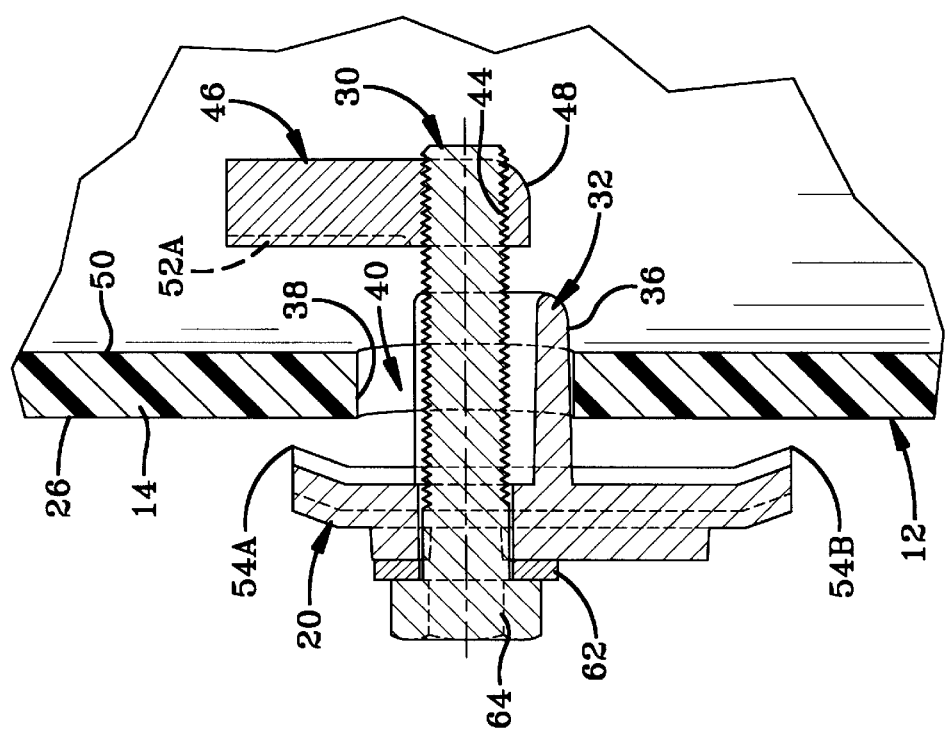
FIG. 12 is a view similar to FIGS. 10 and 11 but depicting the appropriate portion of the step mounting assembly as properly disposed interiorly of the hollow utility pole as well as with a further appropriate portion disposed within the receiving bore through the wall of the hollow utility pole just prior to being disposed for tightening the mounting bolt.

Once the multi-functional projection 32 is axially aligned with the receiving bore 40 in the annular wall 14 of the hollow utility pole 12, it may be translated to effect full insertion—viz.: from the disposition represented in FIG. 12 to the disposition depicted in FIG. 13. The mounting bolt 30 is then retracted to position the rounded end 48 of the elongated bar nut 46 within the confines of radially inner, anti-rotation shroud surface 42 of the projection 32. The progressive taper of the inner, anti-rotation shroud surface 42 will facilitate the entrance of the rounded end 48 of the elongated bar nut 46 within the confines of the multi-functional projection 32. With the parts depicted the threaded shank portion 66 of the mounting bolt 30 may be fully tightened through the threaded bore 44 in the bar nut 46 to clamp the annular wall 14 fully between the reverse face 24 of the backing plate 20 and the elongated bar nut 46, as represented in FIG. 14.

Figure 14:
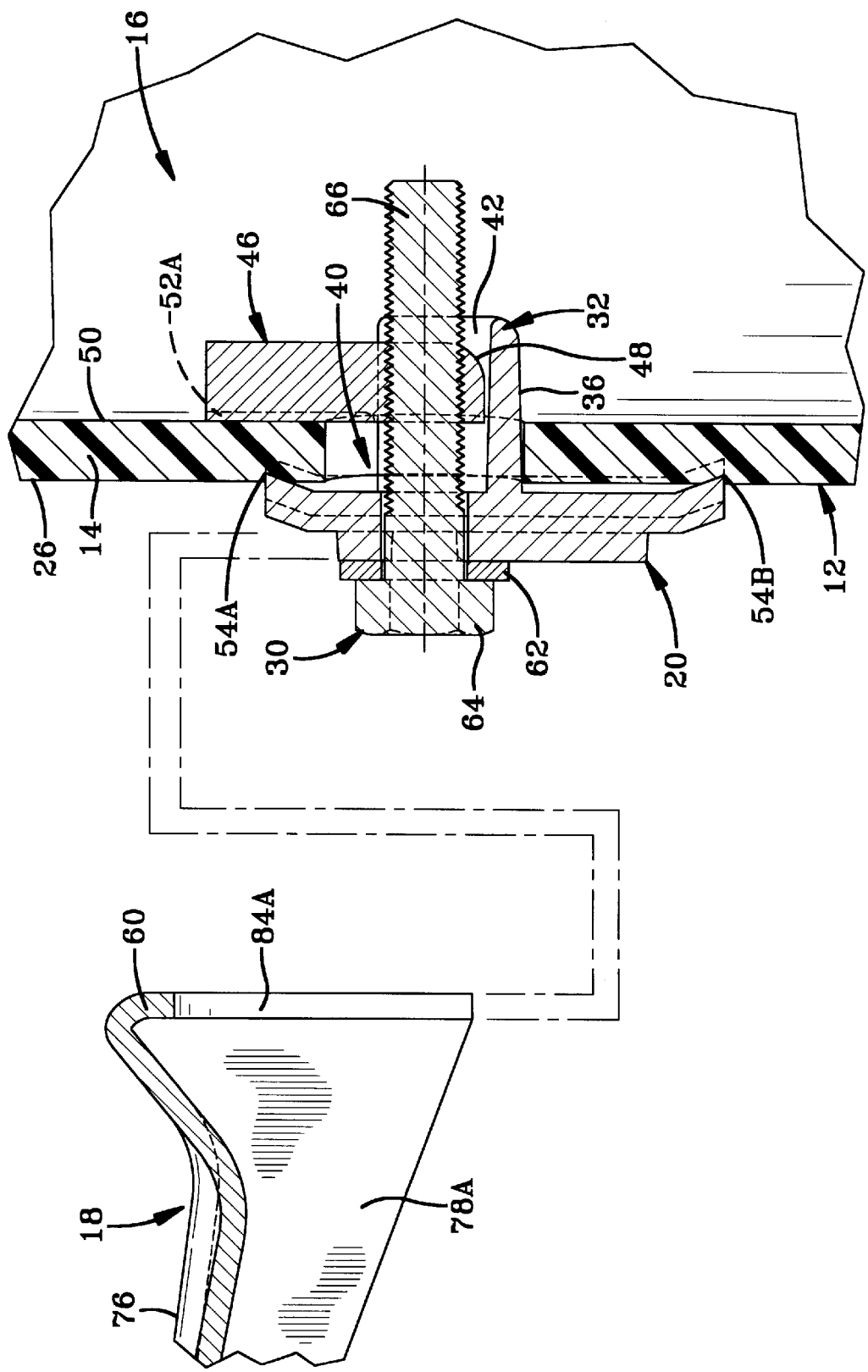

With the step mounting assembly 10 disposed as depicted in FIG. 14, the distance between the inner surface 82 of the washer 62 and the obverse face 22 of the backing plate 20 is predetermined by the location of outer face 58 on the spacer lug 56. That predetermined distance permits the slotted notch 74 on the securing plate 60 of the step member 18 to be manually inserted over the spacer lug 56. As the slotted notch 74 is moved downwardly the sides 84A and 84B of the slotted notch 74 engage the tapered side walls 72A and 72B, respectively, of the stabilizing lug 68 to secure and stabilize the step member 18 on the step mounting assembly 10. To achieve the desired operation of the step mounting assembly 10, the washer 62 must have an inner diameter to be received over threaded shank portion 66 of the mounting bolt 30 and an outer diameter which will not only assure engagement of the inner surface 82 with the securing plate 60 but will also be readily received between the reinforcing flanges 78A and 78B which join the securing plate 60, as best seen in FIG. 2.

The step member 18 can be readily removed by lifting the step member upward to disengage the securing plate 60 from between the backing plate 20 and the opposed washer 62.

Conclusion

The foregoing description of an exemplary embodiment of the step mounting assembly 10 has been presented for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application in order thereby to enable one of ordinary skill in the art to utilize the invention and the various embodiments thereof, including modifications thereof as are suited to the particular use contemplated. All such modifications and variations are within the scope of the invention as determined by the appended claims when interpreted in accordance with the breadth to which they are fairly and legally entitled.

As should now be apparent, the present invention not only teaches that a step mounting assembly embodying the concepts of the present invention permits facile demountable connection of a step member to a hollow utility pole, but also accomplishes the other objects of the invention.

We claim:

1. An assembly for demountably securing a removable step member to a hollow utility pole having a longitudinal extent with at least one bore located along the longitudinal extent thereof, said assembly comprising:

a backing plate having an obverse and a reverse face;

an aperture penetrating said backing plate;

a mounting bolt having a head and a threaded shank;

said shank penetrating said aperture with said head on the obverse side of said backing plate;

a multi-functional projection at least partially circumscribing said aperture and being located on the reverse side of said backing plate;

spacer lug means extending outwardly from the obverse face of said backing plate;

said spacer lug means being located in proximity to said aperture;

a washer interposed between said bolt head and said spacer lug means; and, an elongated bar nut adapted not only to be insertably received through the bore in the utility pole but also to be manipulated to engage said threaded shank on the reverse side of said backing plate.

2. An assembly for demountably securing a removable step to a hollow utility pole, as set forth in claim 1, wherein:

said multi-functional projection engages said elongated bar nut not only to orient said elongated bar nut but also to preclude rotation thereof in response to tightening said bolt.

3. An assembly for demountably securing a removable step to a hollow utility pole, as set forth in claim 2, wherein:

said washer is disposed at a predetermined distance from the obverse face of said backing plate when said mounting bolt is fully tightened, said predetermined distance being selected to receive the removable step member.

4. An assembly for demountably securing a removable step to a hollow utility pole, as set forth in claim 3, further comprising:

a wing portion defining at least one lateral side of said backing plate;

said wing portion being inclined away from said obverse face.

5. An assembly for demountably securing a removable step to a hollow utility pole, as set forth in claim 4, wherein:

said wing portion is inclined at an angle of approximately 20; with respect to said obverse face.

6. An assembly for demountably securing a removable step to a hollow utility pole, as set forth in claim 5, further comprising:

a stabilizing lug extending outwardly from the obverse face of said backing plate;

said stabilizing lug also being located in proximity to said aperture.

7. An assembly for demountably securing a removable step to a hollow utility pole, as set forth in claim 6, wherein:
   said stabilizing lug and said spacer lug are located on opposite sides of said aperture; and,
   said stabilizing lug has side walls which are tapered to flare progressively apart away from said spacer lug.

8. An assembly for demountably securing a removable step to a hollow utility pole, as set forth in claim 6, wherein:
   said stabilizing lug and said spacer lug are located on opposite sides of said aperture; and,
   said stabilizing lug has side walls which are tapered to flare progressively apart away from said spacer lug.

9. An assembly for demountably securing a removable step to a hollow utility pole, as set forth in claim 1, wherein:
   said multi-functional projection has a generally U-shaped cross section; and,
   said elongated bar nut has at least one rounded end wall to engage said U-shaped cross section of said multi-functional projection.

10. An assembly for demountably securing a removable step to a hollow utility pole, as set forth in claim 9, further comprising:
    a toothed crest that extends across said backing plate in a direction transversely with respect to said wing portion.

11. In combination, a step member removably secured to a mounting assembly that is affixed to a utility pole;
    the utility pole comprising:
       a longitudinally extending, hollow structure circumscribed by an outer wall; and,
       at least one bore located along the longitudinal extent of said hollow structure and penetrating said exterior wall;
    the step member comprising:
       a tread portion;
       a securing plate disposed substantially at right angles with respect to said tread portion;
       at least one reinforcing flange means connecting said mounting wall to said tread portion; and,
       an engaging notch provided in said mounting wall;
    the mounting assembly comprising:
       a backing plate for each said bore, said backing plate having an obverse and a reverse face;
       an aperture penetrating each said backing plate;
       a multi-functional projection at least partially circumscribing each said aperture and being located on the reverse side of each said backing plate;
       said multi-functional projection penetrating a selected bore penetrating said outer wall of said hollow structure;
       a mounting bolt for each said backing plate;
       each said mounting bolt having a head and a threaded shank;
       said threaded shank penetrating said aperture in said backing plate and extending through said multi-functional projection, thereby also extending through said bore penetrating said exterior wall of said hollow structure;
       said bolt head remaining on the obverse side of said backing plate;
       spacer lug means extending outwardly from the obverse face of said backing plate;
       said spacer lug means being located in proximity to said aperture to be engaged by said bolt head;
       a washer interposed between said bolt head and said spacer lug means;
       an elongated bar nut located interiorly of said hollow structure; and,
       said elongated bar nut adapted to engage said threaded shank.

12. A combination, as set forth in claim 11, wherein;
    said multi-functional projection engages said elongated bar nut not only to orient said elongated bar nut but also to preclude rotation thereof in response to tightening said bolt.

13. A combination, as set forth in claim 12, wherein:
    said multi-functional projection has a generally U-shaped cross section; and,
    said elongated bar nut has at least one curved end wall to engage said U-shaped cross section of said multi-functional projection.

14. A combination, as set forth in claim 12, wherein;
    a wing portion defining at least one lateral side of said backing plate;
    said wing portion being inclined away from said obverse face to engage said wall of said hollow structure.

15. A combination, as set forth in claim 12, wherein;
    said washer is disposed at a predetermined distance from the obverse face of said backing plate when said mounting bolt is fully tightened;
    said predetermined distance being selected to receive said mounting wall on said removable step member snugly between said washer and said obverse face of said backing plate.

16. An assembly for demountably securing a removable step to a hollow utility pole, said assembly comprising:
    a backing plate having an obverse and a reverse face;
    an aperture penetrating said backing plate;
    a mounting bolt having a head and a threaded shank;
    said shank penetrating said aperture with said head on the obverse side of said backing plate;
    a multi-functional projection at least partially circumscribing said aperture and being located on the reverse side of said backing plate;
    spacer lug means extending outwardly from the obverse face of said backing plate;
    said spacer lug means being located in proximity to said aperture;
    a washer interposed between said bolt head and said spacer lug means;
    an elongated bar nut adapted to engage said threaded shank on the obverse side of said backing plate;
    said multi-functional projection engages said elongated bar nut not only to orient said elongated bar nut but also to preclude rotation thereof in response to tightening said bolt;
    said washer is disposed at a predetermined distance from the obverse face of said backing plate when said mounting bolt is fully tightened, said predetermined distance being selected to receive the removable step member;
    a wing portion defining at least one lateral side of said backing plate; and,
    said wing portion being inclined away from said obverse face.

17. An assembly for demountably securing a removable step to a hollow utility pole, as set forth in claim 16, wherein:
    said wing portion is inclined at an angle of approximately 20 with respect to said obverse face.

18. An assembly for demountably securing a removable step to a hollow utility pole, as set forth in claim 17, further comprising:

a stabilizing lug extending outwardly from the obverse face of said backing plate;

said stabilizing lug also being located in proximity to said aperture.

19. An assembly for demountably securing a removable step to a hollow utility pole, as set forth in claim 16, wherein:

said multi-functional projection has a generally U-shaped cross section; and, said elongated bar nut has at least one rounded end wall to engage said U-shaped cross section of said multi-functional projection.

20. An assembly for demountably securing a removable step to a hollow utility pole, as set forth in claim 19, further comprising:

a toothed crest that extends across said backing plate in a direction transversely with respect to said wing portion.

* * * * *